G. W. SWIFT, Jr.
BAIL MAKING AND INSERTING MECHANISM.
APPLICATION FILED NOV. 13, 1911.
1,129,919.
Patented Mar. 2, 1915.
6 SHEETS—SHEET 6.
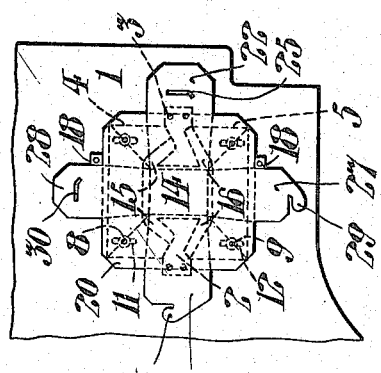
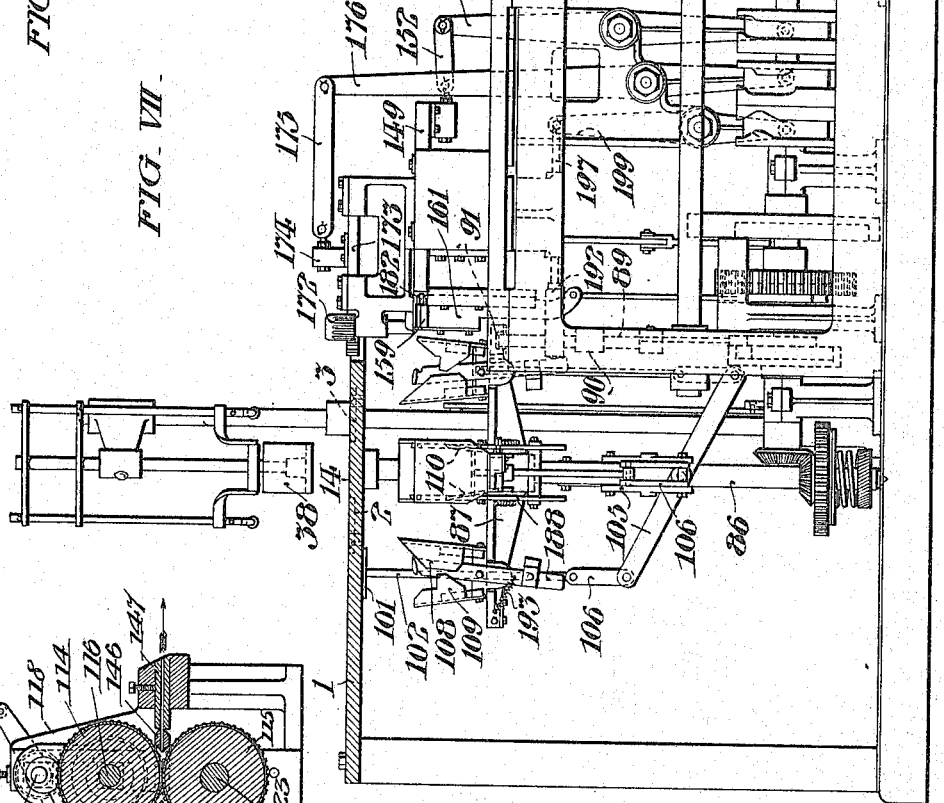
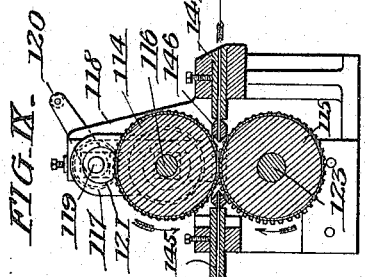
WITNESSES:
Philip W. Vessey
Joseph E. ...
INVENTOR:
George W. Swift Jr.,
By Arthur E. Paige,
Attorney.

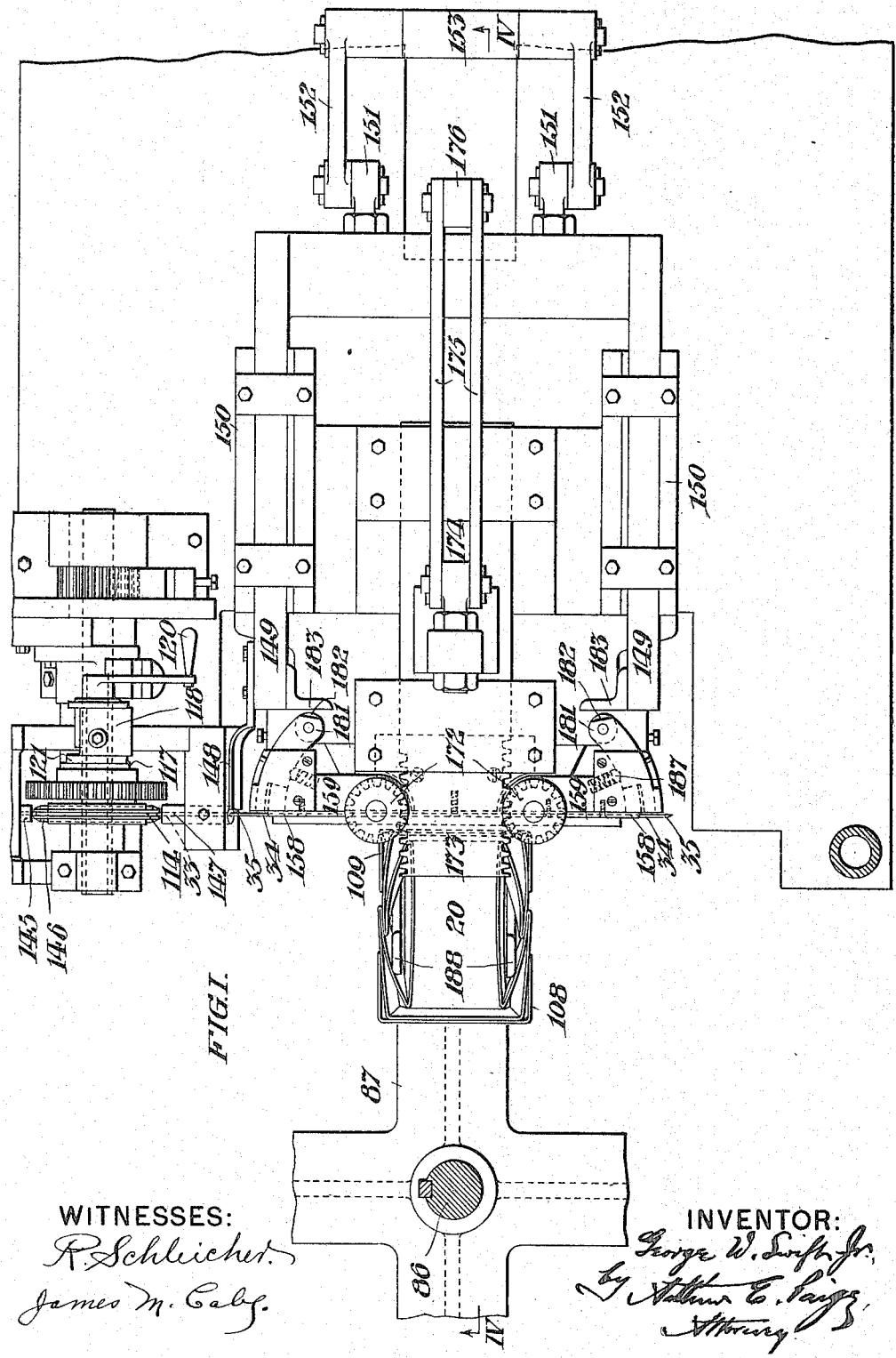

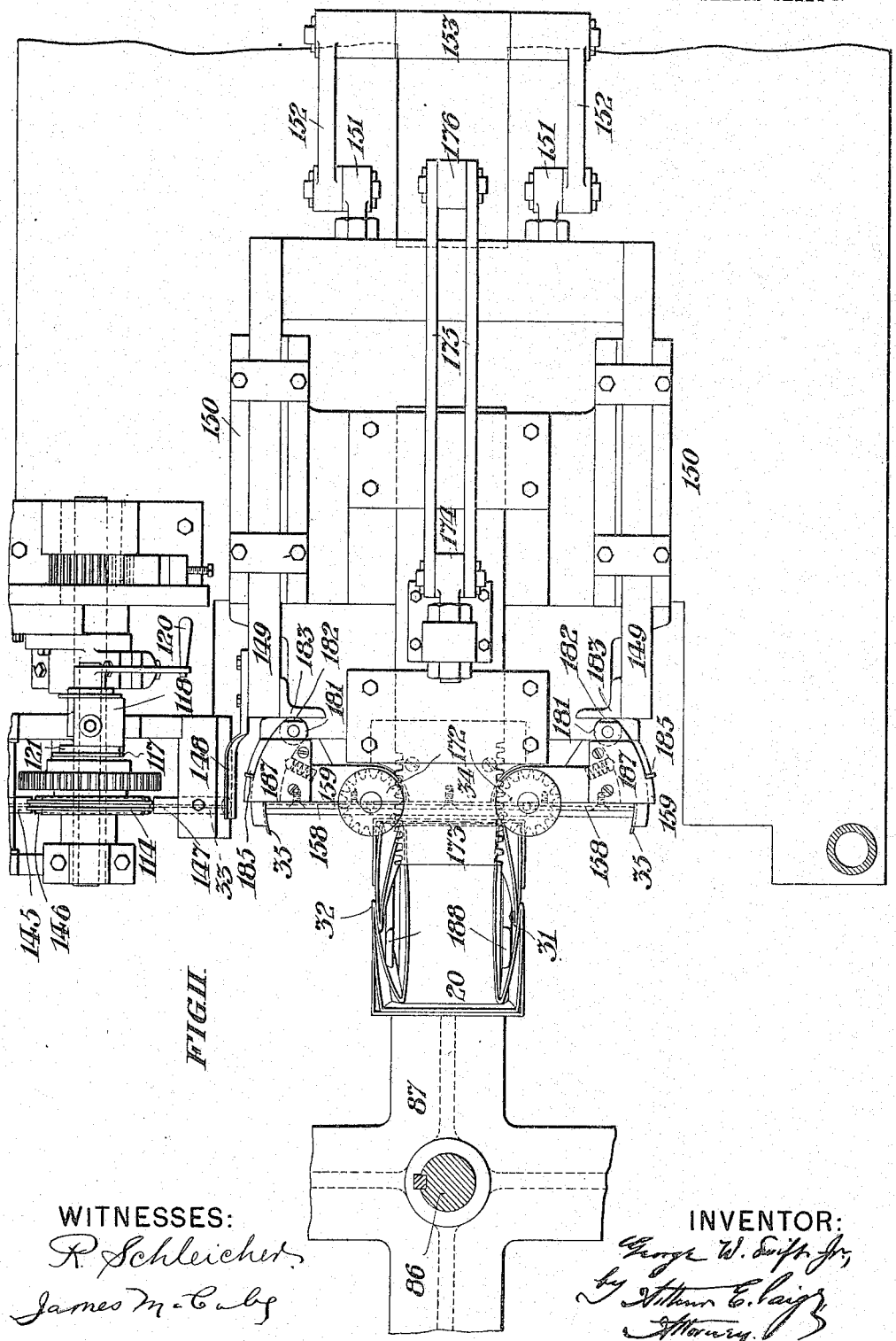

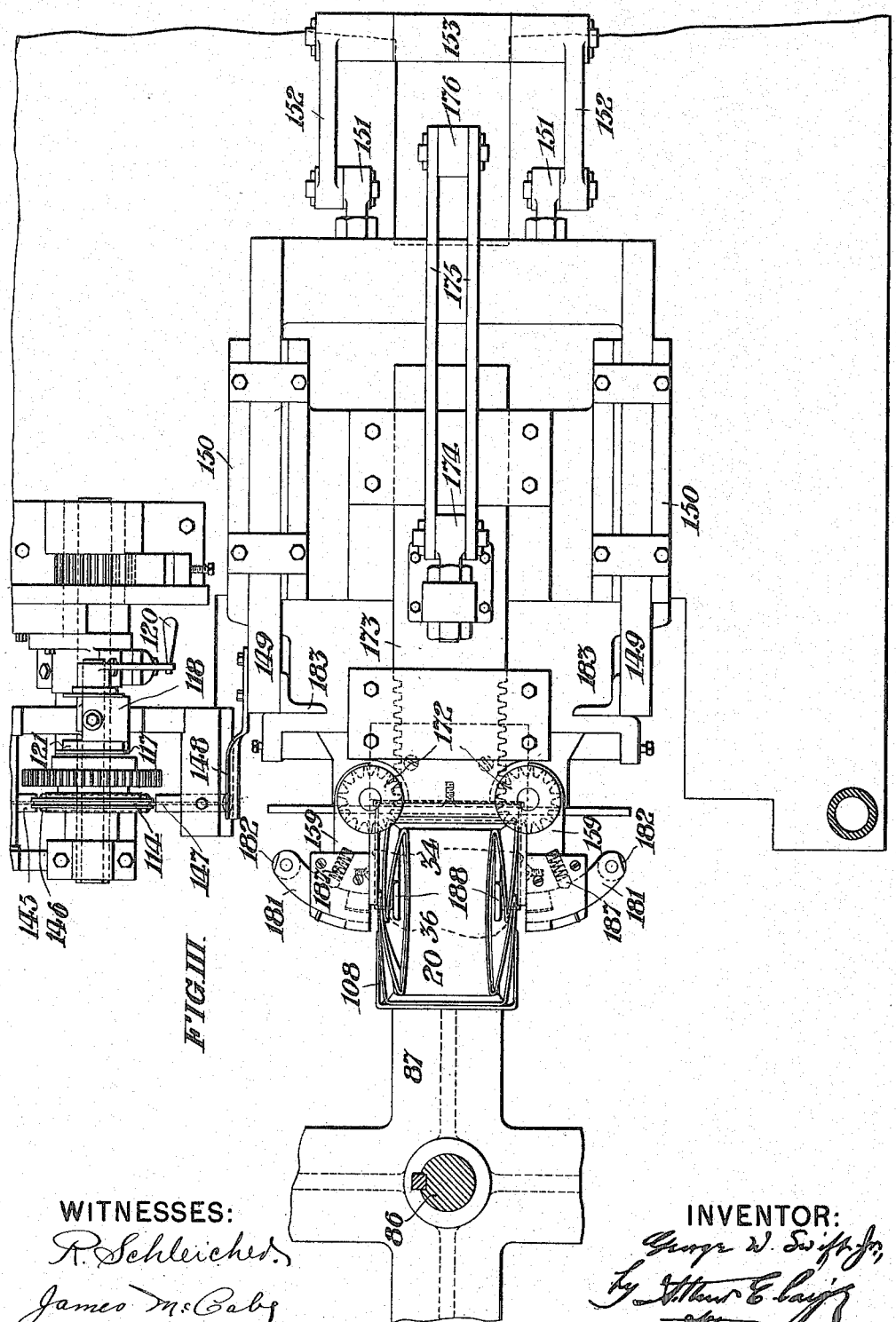

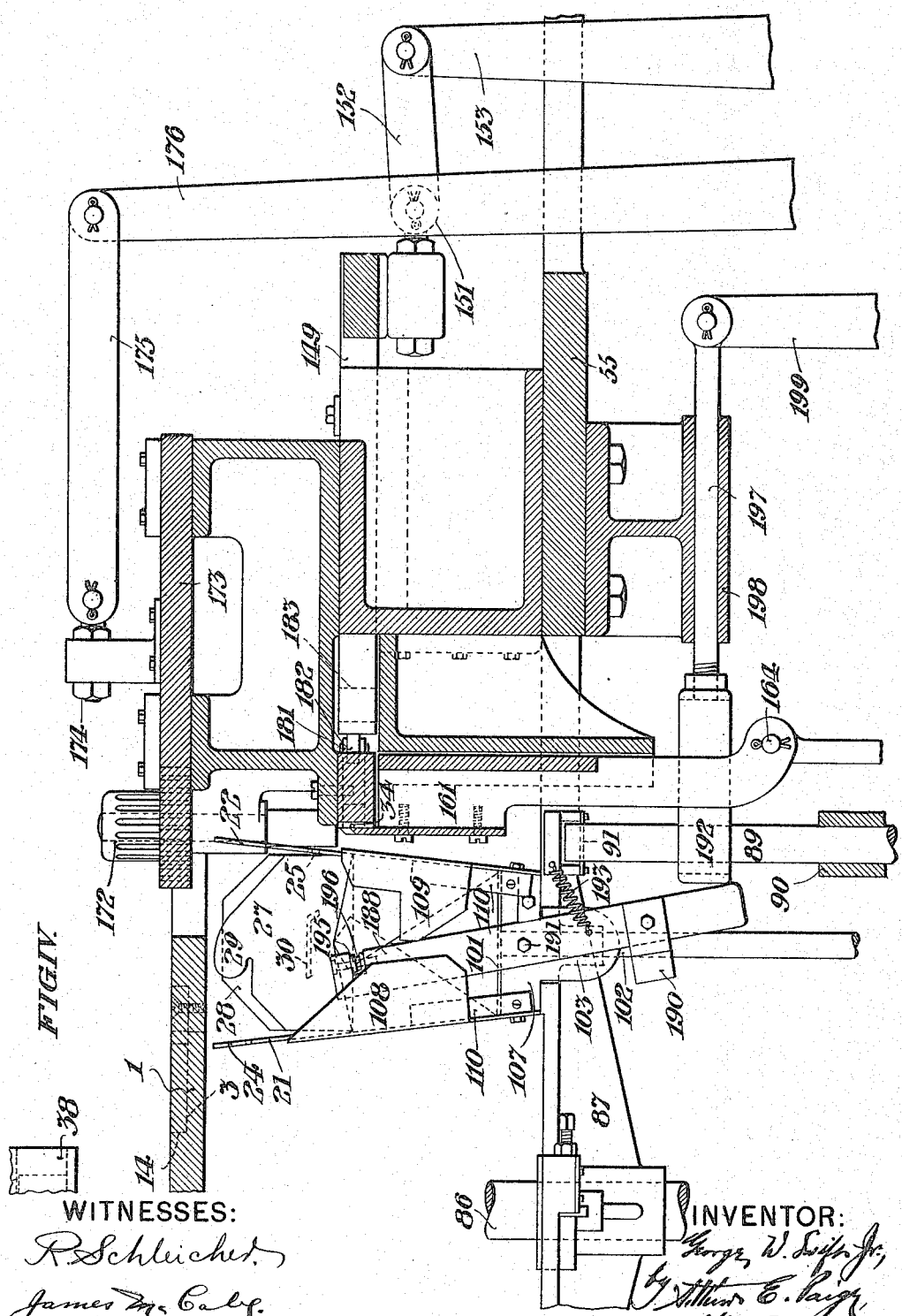

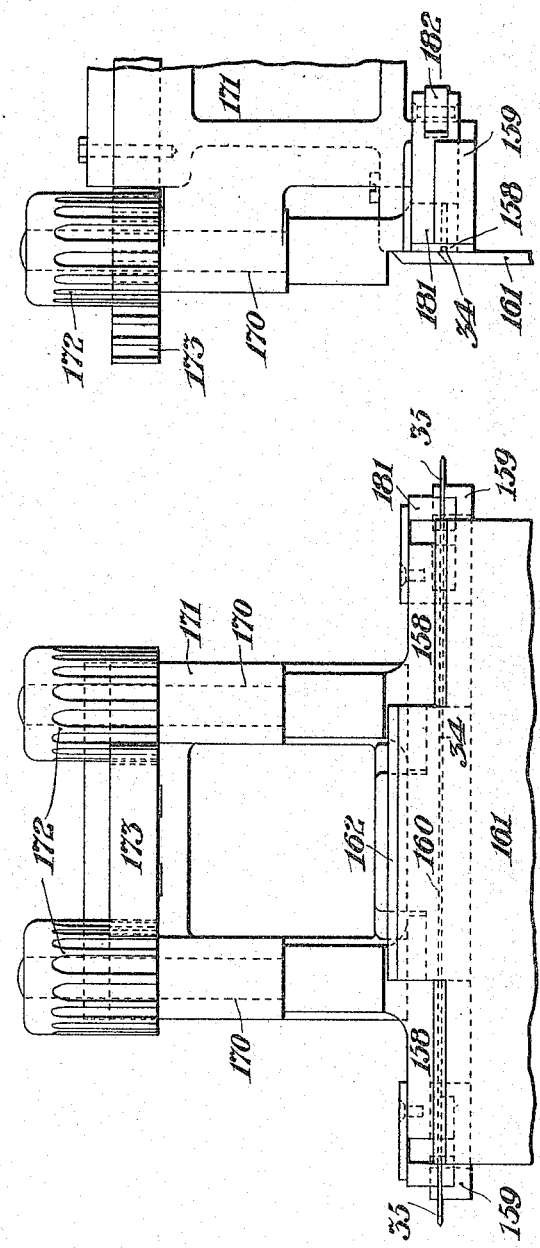

UNITED STATES PATENT OFFICE.

GEORGE W. SWIFT, JR., OF BORDENTOWN, NEW JERSEY.

BAIL MAKING AND INSERTING MECHANISM.

1,129,919. Specification of Letters Patent. Patented Mar. 2, 1915.

Original application filed September 21, 1911, Serial No. 650,492. Divided and this application filed November 13, 1911. Serial No. 660,087.

*To all whom it may concern:*

Be it known that I, GEORGE W. SWIFT, Jr., of Bordentown, in the State of New Jersey, have invented a certain new and useful Improvement in Bail Making and Inserting Mechanism, whereof the following is a specification, reference being had to the accompanying drawings.

This application is a division of my application Serial #650,492 filed September 21, 1911, for Letters Patent of the United States for an improvement in mechanism for making paper receptacles of the class described in Letters Patent of the United States #906,485 dated December 8, 1908, to C. T. Bloomer, such a vessel being seamlessly formed of a single primarily plane sheet and provided with a wire bail handle having its ends clenched through the folds of the vessel so as to retain the same in the desired shape. Said mechanism for making paper receptacles includes a plane table upon which the flat sheet blanks are placed, having a horizontal die opening through which said sheets are successively pressed by a plunger die, the folding of each sheet to proper form being effected by the downward movement of the sheet through said die opening. Each receptacle thus thrust through the table is received in a holder of which there are four respectively mounted upon radial arms on a rotary carrier by which they are successively presented to mechanism which provides them with the wire bails aforesaid and mechanism which discharges them upwardly from said holder.

My invention includes the various novel features of construction and arrangement hereinafter described comprising a wire feeding device, means arranged to shear a predetermined length of the wire, two levers having channels in their faces for the cut length of wire, a vertically reciprocatory slide plate between the fulcrum of said levers around which said wire is bent by said levers to form a bail, sectoral slides carried by said levers arranged to reciprocate therein to inturn the ends of the wire, means arranged to turn said levers toward each other to form a bail and present the inturned ends of said wire on opposite sides of the receptacle and drive them through the outer folds of the latter, a bail clenching device including a pair of oscillatory blades in each of said boxes arranged to extend between the outer folds and inner wall of the receptacle and prevent the bail ends from penetrating the latter, and means arranged to oscillate said blades to clench the ends of said bail in pivotal engagement with said receptacle.

In the drawings: Figures I, II and III are fragmentary plan views of a machine conveniently embodying my invention, with the table and the die removed, showing respectively different positions of the bailing mechanism. Fig. IV is a fragmentary vertical sectional view, taken on the line IV—IV in Fig. I. Fig. V is a fragmentary front elevation of a portion of the bailing mechanism. Fig. VI is a side elevation of the mechanism shown in Fig. V. Fig. VII is a side elevation of the machine with a portion of the table cut away. Fig. VIII is a fragmentary plan view of the horizontal die showing the initial position of the paper blank with respect thereto. Fig. IX is a fragmentary sectional view showing the driving mechanism for the wire feeding rollers.

In said figures; the horizontal plane table 1 is provided with the stationary die including the plates 2, 3, 4 and 5; said plates 4 and 5 being adjustably connected with said table by the screws 8 and 9 extending through the respective slots 11 and 12 in said plates. As best shown in Fig. VIII, the four plates of said stationary die are so correlated as to afford a vertical opening 14 therethrough having opposite lateral extensions 15 and 16. Said table 1 is provided with the stationary abutments 18 adjoining said stationary die at repectively opposite sides thereof to determine the proper position of plane sheet blanks 20 with respect to said die. Blanks 20 of paper or other suitable fabric, being successively laid upon said table in plane position as indicated in Fig. I are successively pressed downward through said opening in said stationary die to form the receptacles. Each blank 20 includes an oblong, substantially rectangular body, from which the body of the receptacle is formed, having four cover flaps. The outer cover flaps 21 and 22 extend from the respectively opposite longer sides of said body; said flap 21 having the hook 24 adapted to be engaged in the slot 25 in said flap 22 when said flaps are overlapped to close the completed receptacle. The inner cover flaps 27 and 28, extend from the shorter sides of said body, the former having the hook 29 adapted to fit in the slot 30 in said flap 28 when said flaps are overlapped to close the receptacle. Said blanks 20 thus thrust through said die opening have their opposite folded corners 31 adjoining the body of the receptacle and overlapped by their opposite folded corners 32 as shown in Fig. I. Said overlapped corners are permanently connected by the wire bail 34 having its opposite ends 35 clenched through said corner folds so that the portions 36 of said bail (indicated in Fig. III,) form pivots upon which said bail may be oscillated in connection with the receptacle. Said receptacles are thus successively formed by vertical reciprocatory movements of the plunger die 38 which are effected in definite relation to intermittent rotary movements of the vertical shaft 86 of the carrier 87 which is positively intermittently turned quarter revolutions, stopped, and held temporarily stationary after each quarter revolution, to present successive receptacles to the bailing mechanism. Said carrier 87 is conveniently brought to rest at each quarter revolution by detent mechanism including the slide 89 which is mounted to reciprocate in the stationary bearing 90 so that it may be uplifted to the position shown in Fig. IV to successively encounter four adjustable stops 91 with which the four radial arms of said carrier 87 are respectively provided; said detent slide 89 being operated in proper relation with the other movements of the machine by any suitable means. The four radial arms of said rotary carrier 87 are respectively provided with horizontal holder plates 101 which, as shown in Fig. IV are respectively provided with vertical stems 102 mounted to reciprocate in bearings 103 in said carrier arms. Said vertically reciprocatory holders by the rotation of said carrier 87 pass in succession in a horizontally circular series beneath said dies, and are successively brought to rest in registry therewith. The diametrically opposite holders in said series are coupled by the yoke levers 105 which are pivotally connected with said stems 102 by the links 106, so that when the holder plate 101 being presented in registry with said dies, immediately beneath the table 1, at the elevation indicated at the left hand side of Fig. IV, is thrust downward by the plunger die 38 pressing the folded blank 20 upon said holder plate, the diametrically opposite holder plate is uplifted to discharge the completed receptacle therefrom. The four holder plates 101 in said series are arranged to reciprocate in respective receptacle guide boxes, each secured in rigid relation with said carrier and conveniently including a cast metal base plate 107 and opposed sheet metal plates 108 and 109; the radially opposite sides of said boxes being downwardly converged as indicated in Fig. IV and the circumferentially opposite sides thereof being vertically parallel as indicated in Fig. I. Each of said boxes is provided with sheet metal strips 110 secured at their lower ends to said base plate 107 and outwardly diverged into contact with the vertical sides of said boxes. It is to be understood that the construction of said boxes above described, is such that the folded receptacles thrust therein while held between the plunger die 38 and the respective holder plates 101 are frictionally engaged in said boxes by the opposed plates 108, 109 and 110 so that each receptacle thrust into a box in registry with the dies aforesaid; by the next quarter turn of the carrier 87 to the position shown in Fig. IV, is presented in proper relation with the bailing mechanism.

The wire 33 for the bail 34 passes into the machine between two sets of straightening rollers having their axes at right angles to each other and supported in connection with the machine frame. Said wire being straightened by its passage between said rollers passes thence between the feed rolls 114 and 115. Said roll 114 is mounted upon the shaft 116 journaled in the bearing links 117 which are vertically adjustable in the frame bracket 118, such adjustment being effected by the rock shaft 119 provided with the operating handle 120 and having the eccentrics 121 journaled in said links. It is to be understood that by manipulation of said handle 120 said roll 114 may be lowered into operative relation with the roll on the shaft 123 or be raised into inoperative position. Said roll 115 is positively intermittently rotated by any suitable means, so as to successively feed respective bail lengths of said wire 33 in definite relation to the other operations of the mechanism. The wire 33 passes between said feed rolls 114 and 115 through the tubular guides 145, 146 and 147, and the precise length of the bail 34 is cut off by the shear blade 148, against the inclined inner end of said guide 147, so as to point the cut wire. The extreme positions of reciprocation of said shear blade 148 with respect to the guide tube 147, are shown respectively in Figs. I and III. Said wire shear blade 148 is carried by the slide frame 149 which is mounted to reciprocate in the frame bearing 150, being adjustably pivotally connected by the eye bolts 151 and links 152 with the cam lever 153 which is fulcrumed on the machine frame and oscillated, by any suitable means, in definite relation to the movement of the other mechanism aforesaid. Said wire 33 passes from said guide tube 147 through channels 158 in the front faces of the wire bending levers 159 shown in Figs. I, II, III, V and VI; said channels in the levers being connected by the intermediate channel 160 in the frame, shown in Fig. V, and, said channels 158 and 160 being closed by the slide 161 during each feeding movement of the wire by the rolls 114 and 115. As shown in Fig. V said slide 161 has the central portion 162 of its upper end which closes the channel 160, extending higher than its lateral portions which close the channels 158, so that the latter may be opened by the downward movement of said slide 161 to permit said levers 159 to bend the wire while the latter is held in the channel 160 by said slide; further downward movement of said slide 161 causing said central portion 162 thereof to uncover said channel 160 and permit the wire to be withdrawn therefrom as a completed bail 34. Said wire bending levers 159 have vertical shafts 170 (shown in Figs. V and VI) journaled in the housing 171 and provided at their upper ends with gear pinions 172 engaging the rack 173 which is mounted to reciprocate in said housing as shown in Fig. IV; said slide having the adjustable eye bolt 174 pivotally connected by the links 175 with the cam lever 176 fulcrumed in said machine frame and oscillated, by any suitable means, in definite relation to the movement of the other mechanism aforesaid. Said levers 159 carry reciprocatory sectoral slides 181 at their outer ends which are normally retracted behind the channels 158 in said levers as indicated in Fig. I, but have rollers 182 to be encountered by the flanges 183 of the slide 149 so that by the forward movement of said slide said sectors are thrust forward to the position shown in Fig. II thus initially bending the ends 35 of the wire at right angles to the intermediate portion of said wire; such movement of said sectors being limited by the pins 185 on said sectors which encounter said levers 159 as shown in Fig. II. Said slide 161 (shown in Figs. V and VI) being then lowered until the lateral portions of its upper end are below the level of said levers 159; the latter are turned from the position shown in Fig. II to the position shown in Fig. III, by the movement of said rack 173, so that the portions of said wire extending in the channels 158 in said levers 159 are bent at right angles at the intermediate portion retained by the central portion 162 of said slide 161, and, said pointed ends 35 of the wire, supported by said sectors as indicated in Fig. II, are thrust through the overlapped folded corners 31 and 32 of the receptacle, said sectors 181 sliding backward in said levers 159 when pressed against the receptacle folds aforesaid and being detained in retracted position by the spring pressed detents 187 until again thrust forward by the movement of said slide 149 after said levers have been returned to the initial position shown in Fig. I, by reverse movement of said rack 173. Each receptacle is thus pivotally connected with a bail having its opposite, axially alined, pointed ends 35 thrust through the opposite overlapped folds thereof, and said ends are then clenched, as shown in Fig. III, between the inner folds and the adjacent side walls of the receptacle, without penetrating the latter, by bail clenching devices, with which each receptacle holder on the carrier 87 is provided, each including a pair of oscillatory blades 188 rigidly connected by a bar 190, as indicated in Fig. IV. Said blades being mounted to oscillate on the axially alined studs 191 at opposite sides of the box base 107, are normally tilted against the abutments 192 as shown in Fig. IV, by the springs 193 connecting them with the carrier 87, so that the ends of said blades, each having a roller 195 with a notch 196 adapted to engage and bend said ends 35 of the bail 34 in the clenching operation, are held out of the way to permit said bail ends 35 to be connected with the receptacle as above described. However, said blades 188 are arranged to be oscillated in proper time to clench said inner ends of the bail, by means of the slide 197 shown in Fig. IV which is mounted to reciprocate in the bearing 198 on the frame and pivotally connected with the cam lever 199 which is fulcrumed on the machine frame and oscillated, by any suitable means, in definite relation to the movement of the other mechanism aforesaid. Upon the completion of the bailing operation aforesaid, said carrier 87 being released by the downward movement of the detent slide 89 said carrier is turned to present the box containing the completed receptacle diametrically opposite to the dies aforesaid, and, said carrier being then detained by the engagement of the slide 89 with the succeeding radial arm of the carrier said completed receptacle is thrust upwardly from the box on said carrier by the upward movement of the holder plate 101 beneath it; said holder plate being uplifted by its coupling lever 105 which is thrust downward at the opposite end by the die 38 pressing another blank 20 through the opening 14 in said stationary die in the table 1.

I do not desire to limit myself to the precise details of construction and arrangement herein set forth as it is obvious that various modifications may be made therein without departing from the essential features of my invention as defined in the appended claims.

I claim:—

1. In mechanism of the class described, the combination with mechanism arranged to hold a receptacle; of bailing mechanism arranged to present the inturned ends of a wire bail on opposite sides of the receptacle and drive them through the outer folds of the latter; a bail clenching device including a pair of oscillatory blades arranged to extend between the outer folds and inner wall of the receptacle; each blade having a roller notched to engage and bend said inturned ends; and means arranged to oscillate said blades to clench the ends of said bail in pivotal engagement with the receptacle.

2. In mechanism of the class described, a bail clenching device including a blade carrying a roller having a notch to engage the bail; and means arranged to move said blade to bend the end of said bail.

3. Bailing mechanism including a wire feeding device, means arranged to shear a bail length of wire, two levers having channels for said bail length of wire, a vertically reciprocatory slide plate between the fulcrums of said levers around which said wire is bent by said levers to form a bail, sectoral slides carried by said levers arranged to reciprocate therein to inturn the ends of the wire, means arranged to turn said levers toward each other to form a bail and present the inturned ends of said wire on opposite sides of the receptacle and drive them through the outer folds of the latter, a bail clenching device including a pair of oscillatory blades arranged to extend between the outer folds and inner wall of the receptacle and prevent the bail ends from penetrating the latter, and means arranged to move said blades to clench the ends of said bail in pivotal engagement with the receptacle.

4. Bailing mechanism including a wire feeding device, means arranged to shear a bail length of wire, two levers having means to hold said bail length of wire, a reciprocatory slide plate between the fulcrums of said levers around which said wire is bent by said levers to form a bail, slides carried by said levers arranged to move therein to inturn the ends of the wire, means arranged to turn said levers toward each other to form a bail and present the inturned ends of said wire on opposite sides of the receptacle and drive them through the outer folds of the latter, a bail clenching device including a pair of blades arranged to extend between the outer folds and inner wall of the receptacle and prevent the bail ends from penetrating the latter, and means arranged to move said blades to clench the ends of said bail in pivotal engagement with the receptacle.

5. Bailing mechanism including a wire feeding device, two levers having means to hold a bail length of wire, a reciprocatory slide plate between the fulcrums of said levers around which said wire is bent by said levers to form a bail, members carried by said levers arranged to move relatively thereto to inturn the ends of the wire, means arranged to turn said levers toward each other to form a bail and present the inturned ends of said wire on opposite sides of the receptacle and drive them through the outer folds of the latter, a bail clenching device including a pair of blades arranged to extend between the outer folds and inner wall of the receptacle and prevent the bail ends from penetrating the latter, and means arranged to move said blades to clench the ends of said bail in pivotal engagement with the receptacle.

6. Bailing mechanism including a wire feeding device, two levers having means to hold a bail length of wire, a movable member between the fulcrums of said levers around which said wire is bent by said levers to form a bail, members carried by said levers arranged to move relatively thereto to inturn the ends of the wire, means arranged to turn said levers toward each other to form a bail and present the inturned ends of said wire on opposite sides of the receptacle and drive them through the outer folds of the latter, a bail clenching device including a pair of blades, and means arranged to move said blades to clench the ends of said bail in pivotal engagement with the receptacle.

7. Bailing mechanism including a frame; a wire feeder supported by said frame including opposed rolls having relatively movable axes; means arranged to shift the shaft of one of said rolls toward and away from the other to render said feeding device respectively operative and inoperative, including a movable eccentric bearing for said movable shaft; bailing mechanism supported by said frame including a pair of wire bending levers having channels for said wire, a reciprocatory slide plate between the fulcrums of said levers, around which said wire is bent by said levers to form a bail, means to present said channels in alinement to receive said wire and then turn said levers toward each other to form a bail, means carried by said levers arranged to inturn the ends of said bail wire; whereby the bent ends of said bail are presented in axial alinement upon opposite sides of a receptacle and driven therein; and mechanism arranged to clench the ends of said wire in pivotal engagement with said receptacle.

8. In a machine for bailing paper-pails or the like, and in combination, means for holding in position a formed pail having lapping side-wings; a plate adapted to occupy a position between the body of the pail and said lapping wings, and provided with an opening to receive the end of the bail; means for placing a wire bail in position with its ends opposite said side-wings; means for forcing the ends of the bail through said side-wings; and means for bending the ends of the bail.

9. In a machine for bailing paper-pails or the like, and in combination, means for holding in position a formed pail having lapping side-wings; means for supporting a bail with its ends opposite said side-wings; means for driving the ends of the bail through said side-wings; a plate adapted to occupy a position between the body of the pail and said side-wings, and provided with an opening to receive the bail-end; and means for bending the ends of the bail.

10. In mechanism of the class described, a bail clenching device including a blade having a notch to engage the bail; and means arranged to move said blade to bend the end of said bail.

11. In a machine for bailing paper pails or the like, means for holding in position a formed pail having lapping side-wings; means for supporting a bail with its ends opposite said side-wings; means for driving the ends of the bail through said side-wings; and means interposed between the body of the pail and its side-wings arranged to support said wings against the thrust of the bail inserting mechanism and to bend the ends of the bail.

12. In a machine for bailing paper pails or the like, means for holding in position a formed pail having lapping side-wings; means for driving the ends of the bail through said side-wings; and means interposed between the body of the pail and its side-wings arranged to support said wings against the thrust of the bail inserting mechanism and to bend the ends of the bail.

13. In a machine for bailing paper pails or the like, means for holding in position a formed pail having lapping side-wings; means for supporting a bail with its ends opposite said side-wings; means for driving the ends of the bail through said side-wings; and means interposed between the body of the pail and its side-wings arranged to support said wings against the thrust of the bail inserting mechanism.

14. In a machine for bailing paper pails or the like, means for holding in position a formed pail having lapping side-wings; means for driving the ends of the bail through said side-wings; and means interposed between the body of the pail and its side-wings arranged to support said wings against the thrust of the bail inserting mechanism.

15. In a machine for bailing paper pails or the like, means for holding in position a formed pail having lapping side-wings, means for supporting a bail with its ends opposite said side-wings; means for driving the ends of the bail through said side-wings; and means adapted to occupy a position between the body of the pail and said side-wings and to bend the ends of the bail.

16. In a machine for bailing paper pails or the like, means for holding in position a formed pail having lapping side-wings, means for driving the ends of the bail through said side-wings; and means adapted to occupy a position between the body of the pail and said side-wings and to bend the ends of the bail.

17. In a machine for bailing paper pails or the like, means for holding in position a formed pail having lapping side-wings, means for supporting a bail with its ends opposite said side-wings; means for driving the ends of the bail through said side-wings; and means adapted to occupy a position between the body of the pail and said side-wings and to support said wings against the thrust of the bail-inserting mechanism.

18. In a machine for bailing paper pails or the like, means for holding a formed pail having lapping side-wings; and a bail inserting and clenching mechanism comprising in part a member interposed between the body of the pail and its side-wings, coöperative with said wings to support the same against the thrust of the bail-inserting mechanism, and arranged to bend the ends of the bail.

19. In a machine for bailing paper pails or the like, means for holding a formed pail having lapping side-wings; a bail inserting and clenching mechanism comprising in part a member interposed between the body of the pail and its side-wings and coöperative with said wings to support the same against the thrust of the bail-inserting mechanism.

20. In a machine for bailing paper pails or the like, means for holding a formed pail having lapping side-wings; and a bail inserting and clenching mechanism comprising in part a member interposed between the body of the pail and its side-wings and arranged to bend the ends of the bail.

21. In a machine for bailing paper pails or the like, means for holding in position a formed pail having lapping side-wings; and a bail inserting and clenching mechanism comprising in part a member interposed between the body of the pail and its side-wings.

22. In a machine for bailing paper pails or the like, a form adapted to be inserted within the body of the pail; and a bail inserting and clenching mechanism comprising in part a member interposed between the body of the pail and its lapping side-wings, arranged to support said wings against the thrust of the bail-inserting mechanism and bend the ends of the bail.

23. In a machine for bailing paper pails or the like, a form adapted to be inserted within the body of the pail; and a bail inserting and clenching mechanism comprising in part a member interposed between the body of the pail and its lapping side-wings arranged to support said wings against the thrust of the bail inserting mechanism.

24. In a machine for bailing paper pails or the like, a form adapted to be inserted within the body of the pail; and a bail inserting and clenching mechanism comprising in part a member interposed between the body of the pail and its lapping side-wings, arranged to bend the ends of the bail.

25. In a machine for bailing paper pails or the like, a holder exterior to the body of the pail; and a bail inserting and clenching mechanism comprising in part a member interposed between the body of the pail and its lapping side-wings, arranged to support said wings against the thrust of the bail-inserting mechanism and bend the ends of the bail.

26. In a machine for bailing paper pails or the like, a holder exterior to the body of the pail; and a bail inserting and clenching mechanism comprising in part a member interposed between the body of the pail and its lapping side-wings arranged to support said wings against the thrust of the bail-inserting mechanism.

27. In a machine for bailing paper pails or the like, a holder exterior to the body of the pail; and a bail inserting and clenching mechanism comprising in part a member interposed between the body of the pail and its lapping side-wings, arranged to bend the ends of the bail.

28. In a machine for bailing paper pails or the like, a holder exterior to the body of the pail; and a bail inserting and clenching mechanism comprising in part a member interposed between the body of the pail and its lapping side-wings.

29. In a machine for bailing paper pails or the like, means for holding in position a formed pail having lapping side-wings; means arranged to insert and clench a bail through said side-wings; and means extending between said wings and the body of the pail preventing the bail from penetrating said body.

30. Means for holding a formed pail having lapping side-wings; means arranged to insert and clench a wire through said side-wings; and means extending between said wings and the body of the pail preventing said wire from penetrating said body.

31. Means for holding a receptacle formed of plane sheet fabric and having folded portions exterior to its body; means arranged to insert and clench a metal element through said folded portions; and means extending between said folded portions and the body of the pail preventing said metal element from penetrating said body.

32. In a machine for bailing paper pails and the like, a circular series of holders for pails; bail inserting and clenching mechanism; and means arranged to successively shift said holders to and from operative relation with said mechanism.

33. In a machine for bailing paper pails and the like, a series of holders for pails; bail inserting and clenching mechanism; and means arranged to successively shift said holders to and from operative relation with said mechanism.

34. In a machine for bailing paper pails or the like, a holder for the pail; bail inserting and clenching mechanism including a member interposed between the body of the pail and its lapping side-wings; and means arranged to shift said holder to and from operative relation with said mechanism.

35. In a machine for bailing paper pails or the like, a holder for the pail; bail inserting and clenching mechanism; and means arranged to shift said holder to and from operative relation with said mechanism.

36. Bailing mechanism including two levers having channels for a bail length of wire, a slide plate between said levers around which said wire is bent by said levers to form a bail, and elements carried by, and movable with respect to, said levers, arranged to inturn the ends of said wire, and means arranged to turn said levers toward each other to form a bail.

37. Bailing mechanism including two levers having channels for a bail length of wire, a movable member between said levers around which said wire is bent by said levers to form a bail, and elements carried by, and movable with respect to, said levers, arranged to inturn the ends of said wire, and means arranged to turn said levers toward each other to form a bail.

38. Bailing mechanism including a frame; a wire feeder supported by said frame including opposed rolls having relatively movable axes; and means arranged to shift the shaft of one of said rolls toward and away from the other to render said feeding device respectively operative and inoperative, including a movable eccentric bearing for said movable shaft; bailing mechanism supported by said frame including a pair of wire bending levers having channels for said wire, a reciprocatory slide plate between the fulcrums of said levers, around which said wire is bent by said levers to form a bail, means to present said channels in alinement to receive said wire and then turn said levers toward each other to form a bail, means carried by said levers arranged to inturn the ends of said bail wire; whereby the bent ends of said bail are presented in axial alinement upon opposite sides of a receptacle and driven therein; and, mechanism arranged to clench the ends of said wire in engagement with said receptacle.

39. In mechanism of the class described, the combination with mechanism arranged to hold a receptacle; of bailing mechanism arranged to present the inturned ends of a wire bail on opposite sides of the receptacle and drive them through the outer folds of the latter; and a bail clenching device including a pair of oscillatory blades arranged to extend between the outer folds and inner wall of the receptacle.

40. Bailing mechanism including a wire feeding device, means arranged to shear a bail length of wire, two levers having channels for said bail length of wire, a vertically reciprocatory slide plate between the fulcrums of said levers around which said wire is bent by said levers to form a bail, sectoral slides carried by said levers arranged to reciprocate therein to inturn the ends of the wire, and means arranged to turn said levers toward each other to form a bail and present the inturned ends of said wire on opposite sides of the receptacle and drive them through the outer folds of the latter.

41. Bailing mechanism including a wire feeding device, means arranged to shear a bail length of wire, two levers having means to hold said bail length of wire, a reciprocatory slide plate between the fulcrums of said levers around which said wire is bent by said levers to form a bail, slides carried by said levers arranged to move therein to inturn the ends of the wire, and means arranged to turn said levers toward each other to form a bail and present the inturned ends of said wire on opposite sides of the receptacle and drive them through the outer folds of the latter.

42. Bailing mechanism including a wire feeding device, two levers having means to hold a bail length of wire, a reciprocatory slide plate between the fulcrums of said levers around which said wire is bent by said levers to form a bail, members carried by said levers arranged to move relatively thereto to inturn the ends of the wire, and means arranged to turn said levers toward each other to form a bail and present the inturned ends of said wire on opposite sides of the receptacle and drive them through the outer folds of the latter.

43. Bailing mechanism including a wire feeding device, two levers having means to hold a bail length of wire, a movable member between the fulcrums of said levers around which said wire is bent by said levers to form a bail, members carried by said levers arranged to move relatively thereto to inturn the ends of the wire, and means arranged to turn said levers toward each other to form a bail and present the inturned ends of said wire on opposite sides of the receptacle and drive them through the outer folds of the latter.

44. Bailing mechanism including a frame; a wire feeder supported by said frame including opposed rolls having relatively movable axes; and means arranged to shift the shaft of one of said rolls toward and away from the other to render said feeding device respectively operative and inoperative, including a movable eccentric bearing for said movable shaft.

45. Bailing mechanism including a frame; a wire feeder supported by said frame including opposed rolls having relatively movable axes; and means arranged to shift the shaft of one of said rolls toward and away from the other to render said feeding device respectively operative and inoperative.

In testimony whereof, I have hereunto signed my name at Bordentown, New Jersey, this tenth day of November, 1911.

GEORGE W. SWIFT, Jr.

Witnesses:
HAROLD BLEDE,
LOUISE B. TAYLOR.

It is hereby certified that in Letters Patent No. 1,129,919, granted March 2, 1915, upon the application of George W. Swift, Jr., of Bordentown, New Jersey, for an improvement in "Bail Making and Inserting Mechanism," errors appear in the printed specification requiring correction as follows: Page 1, line 44, for the word "fulcrum" read *fulcrums;* page 2, line 112, for the word "of" read *for;* and that the said Letters Patent should be read with these corrections therein that the same may conform to the record of the case in the Patent Office.

Signed and sealed this 23rd day of March, A. D., 1915.

[SEAL.]

J. T. NEWTON,

*Acting Commissioner of Patents.*